United States Patent
Kuwabara

(12) 
(10) Patent No.: US 12,305,025 B2
(45) Date of Patent: May 20, 2025

(54) POLYMER COMPOSITION, CROSS-LINKED PRODUCT, AND TIRE

(71) Applicant: ENEOS MATERIALS CORPORATION, Tokyo (JP)

(72) Inventor: Rikimaru Kuwabara, Minato-ku (JP)

(73) Assignee: ENEOS MATERIALS CORPORATION, Tokyo (JP)

( * ) Notice: Subject to any disclaimer, the term of this patent is extended or adjusted under 35 U.S.C. 154(b) by 783 days.

(21) Appl. No.: 17/292,791

(22) PCT Filed: Dec. 2, 2019

(86) PCT No.: PCT/JP2019/047021
§ 371 (c)(1),
(2) Date: May 11, 2021

(87) PCT Pub. No.: WO2020/116389
PCT Pub. Date: Jun. 11, 2020

(65) Prior Publication Data
US 2021/0395500 A1   Dec. 23, 2021

(30) Foreign Application Priority Data

Dec. 3, 2018 (JP) .................................. 2018-226817

(51) Int. Cl.
| | | |
|---|---|---|
| C08L 15/00 | (2006.01) | |
| B60C 1/00 | (2006.01) | |
| C08J 3/00 | (2006.01) | |
| C08J 3/24 | (2006.01) | |
| C08K 3/04 | (2006.01) | |
| C08K 3/36 | (2006.01) | |
| C08K 5/5445 | (2006.01) | |
| C08L 9/06 | (2006.01) | |
| C08L 101/02 | (2006.01) | |

(52) U.S. Cl.
CPC ............. *C08L 15/00* (2013.01); *B60C 1/00* (2013.01); *C08J 3/005* (2013.01); *C08J 3/24* (2013.01); *C08K 3/04* (2013.01); *C08K 3/36* (2013.01); *C08K 5/5445* (2021.01); *C08L 9/06* (2013.01); *C08L 101/02* (2013.01)

(58) Field of Classification Search
CPC . C08L 15/00; C08L 9/06; C08L 10/02; B60C 1/00; C08J 3/24; C08J 3/05; C08K 3/04; C08K 3/36

USPC .......................................................... 523/156
See application file for complete search history.

(56) References Cited

U.S. PATENT DOCUMENTS

| | | | |
|---|---|---|---|
| 2011/0112212 A1 | 5/2011 | Kimura et al. | |
| 2013/0345335 A1* | 12/2013 | Shibata .................. | C08L 25/10 523/156 |
| 2020/0339768 A1* | 10/2020 | Kuwabara ............... | C08J 5/042 |

FOREIGN PATENT DOCUMENTS

| | | | |
|---|---|---|---|
| JP | 11-29663 A | 2/1999 | |
| JP | 2002-121326 A | 4/2002 | |
| JP | 2011-1404 A | 1/2011 | |
| JP | 2015-113425 A | 6/2015 | |
| JP | 6332090 B2 | 5/2018 | |
| JP | 6350508 B2 | 7/2018 | |
| JP | 6350509 B2 | 7/2018 | |
| WO | WO 2009/072650 A1 | 6/2009 | |
| WO | WO-2018101022 A1 * | 6/2018 | ............. C08J 5/042 |

OTHER PUBLICATIONS

Extended European Search Report issued Jan. 13, 2022 in corresponding European Patent Application No. 19892472.2, 7 pages.
Notice of Reasons for Refusal issued Jul. 4, 2023 in Japanese Patent Application No. 2020-559175 (with English machine translation), 6 pages.
International Search Report issued Feb. 18, 2020 in PCT/JP2019/047021 filed Dec. 2, 2019, 3 pages.

* cited by examiner

*Primary Examiner* — Ruiyun Zhang
(74) *Attorney, Agent, or Firm* — Oblon, McClelland, Maier & Neustadt, L.L.P.

(57) ABSTRACT

This polymer composition includes: a modified conjugated diene-based polymer having at least one nitrogen-containing functional group selected from the group consisting of a primary amino group, a secondary amino group, a tertiary amino group, a primary amino group having been protected or converted into an onium group, a secondary amino group having been protected or converted into an onium group, and a tertiary amino group having been converted into an onium group; and a functional-group-containing polymer having at least one functional group selected from the group consisting of an epoxy group, an acid anhydride structure, an oxazoline group, a hydroxyl group, a carboxyl group, and a sulfo group.

8 Claims, No Drawings

POLYMER COMPOSITION, CROSS-LINKED PRODUCT, AND TIRE

CROSS-REFERENCE TO RELATED APPLICATIONS

The present application is the national stage of international application PCT/JP2019/047021, filed on Dec. 2, 2019, and claims the benefit of the filing date of Japanese Patent Application No. 2018-226817 filed on Dec. 3, 2018, the content of which is incorporated herein by reference.

TECHNICAL FIELD

The present disclosure relates to a polymer composition, a crosslinked product, and a tire.

BACKGROUND ART

A conjugated diene-based polymer (e.g., styrene-butadiene copolymer) prepared through polymerization of a conjugated diene compound exhibits good properties (e.g., heat resistance, wear resistance, mechanical strength, and processability). Thus, the conjugated diene-based polymer has been used in various industrial products, including pneumatic tires, vibration-proof rubbers, and hoses. In particular, a conjugated diene-based polymer (S-SBR) prepared through solution polymerization has a relatively narrow molecular weight distribution profile and is suitably used as a material for a fuel-efficient tire.

In order to produce a tire exhibiting superior fuel efficiency from a conjugated diene-based polymer, various modified conjugated diene-based polymers have been proposed, in which a functional group capable of interacting with silica is bonded to the terminal of a conjugated diene-based polymer chain or the main chain of the polymer. Such a modified conjugated diene-based polymer exhibits higher affinity to a reinforcing filler (e.g., carbon black or silica), as compared with an unmodified conjugated diene-based polymer. Thus, when the modified conjugated diene-based polymer is used for a tire, the tire can reduce heat generation and achieve improved fuel efficiency. There has been proposed a polymer composition for producing a rubber product exhibiting improved properties, the composition containing a rubber component (e.g., a conjugated diene-based polymer) and a resin component (e.g., a polyolefin-based resin) (see, for example, Patent Documents 1 to 4).

PRIOR ART DOCUMENTS

Patent Documents

Patent Document 1: JP-A-2002-121326
Patent Document 2: JP-B-6332090
Patent Document 3: JP-B-6350508
Patent Document 4: JP-B-6350509

SUMMARY OF THE INVENTION

Technical Problem

Use of a modified conjugated diene-based polymer prevents aggregation of a reinforcing filler and can improve the fuel efficiency of the resultant crosslinked rubber. However, the polymer tends to cause a reduction in rigidity (i.e., an index of steering stability); specifically, a reduction in, for example, storage modulus (G') under infinitesimal deformation. Thus, fuel efficiency and steering stability, which are properties important for a tire, are in a trade-off relation. In view of, for example, recent environmental circumstances, increasing awareness about resource savings and energy savings, and increasing consumer needs for mobility, rubber materials for automobile tires have been required to achieve fuel efficiency (rolling resistance) and steering stability superior to those of conventional tires.

In view of the foregoing, an object of the present disclosure is to provide a polymer composition capable of producing a crosslinked product that achieves well-balanced fuel efficiency and rigidity.

In order to solve the aforementioned problems, the present disclosure provides a polymer composition, a production method therefor, a cross-linked product, and a tire, which are described below.

[1] A polymer composition including:
a modified conjugated diene-based polymer having at least one nitrogen-containing functional group selected from the group consisting of a primary amino group, a secondary amino group, a tertiary amino group, a primary amino group having been protected or converted into an onium group, a secondary amino group having been protected or converted into an onium group, and a tertiary amino group having been converted into an onium group; and
a functional-group-containing polymer having at least one functional group selected from the group consisting of an epoxy group, an acid anhydride structure, an oxazoline group, a hydroxyl group, a carboxyl group, and a sulfo group.

[2] A method for producing a polymer composition, the method including a step of mixing the following modified conjugated diene-based polymer (A) and functional-group-containing polymer (B):
(A) a modified conjugated diene-based polymer having at least one nitrogen-containing functional group selected from the group consisting of a primary amino group, a secondary amino group, a tertiary amino group, a primary amino group having been protected or converted into an onium group, a secondary amino group having been protected or converted into an onium group, and a tertiary amino group having been converted into an onium group; and
(B) a functional-group-containing polymer having at least one functional group selected from the group consisting of an epoxy group, an acid anhydride structure, an oxazoline group, a hydroxyl group, a carboxyl group, and a sulfo group.

[3] A method for producing a crosslinked product, the method including:
a step of adding a crosslinking agent to a polymer composition produced through the method of the above [2]; and
a step of performing a crosslinking treatment after addition of the crosslinking agent.

[4] A cross-linked produced through crosslinking of the polymer composition of the above [1].

[5] A tire formed from the polymer composition of the above [1].

Effects of the Invention

According to the present disclosure, a crosslinked product achieving well-balanced rigidity and fuel efficiency can be produced.

DESCRIPTION OF EMBODIMENTS

Embodiments of the present disclosure will next be described in detail. As used herein, the term "to" between two numerical values indicates that the numeric values before and after the term are inclusive as the lower limit value and the upper limit value, respectively.

<<Polymer Composition>>

The polymer composition of the present disclosure contains a modified conjugated diene-based polymer (A) and a functional-group-containing polymer (B).

<Modified Conjugated Diene-Based Polymer (A)>

The modified conjugated diene-based polymer (A) (hereinafter may be referred to simply as "polymer (A)") has at least one nitrogen-containing functional group selected from the group consisting of a primary amino group, a secondary amino group, a tertiary amino group, a primary amino group having been protected or converted into an onium group, a secondary amino group having been protected or converted into an onium group, and a tertiary amino group having been converted into an onium group. The polymer (A) may have a nitrogen-containing functional group at a terminal of the polymer, at a side chain of the polymer, or at both a terminal and side chain of the polymer. The nitrogen-containing functional group is preferably bonded to at least one terminal (more preferably bonded to both terminals) of the polymer (A), since the resultant crosslinked product exhibits high rigidity, and better rolling resistance can be achieved. The polymer (A) can be produced through polymerization of a monomer containing a conjugated diene compound in the presence of a polymerization initiator.

<Polymerization Step>

(Conjugated Diene Compound)

Examples of the conjugated diene compound used in the polymerization step include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, 2-chloro-1,3-butadiene. Among these, 1,3-butadiene, isoprene, and 2,3-dimethyl-1,3-butadiene may preferably be used. Particularly preferred is 1,3-butadiene, since such a 1,3-butadiene achieves well-balanced improvements in processability and low hysteresis loss property. These conjugated diene compounds may be used singly or in combination of two or more species.

The polymer (A) may be a homopolymer of the conjugated diene compound, but is preferably a copolymer having a structural unit derived from the conjugated diene compound and a structural unit derived from the aromatic vinyl compound from the viewpoint of improving the strength of the rubber. Examples of the aromatic vinyl compound include styrene, 2-methylstyrene, 3-methylstyrene, 4-methylstyrene, α-methylstyrene, 2,4-dimethylstyrene, 2,4-diisopropylstyrene, 4-t-butylstyrene, 5-t-butyl-2-methylstyrene, vinylethylbenzene, divinylbenzene, trivinylbenzene, divinylnaphthalene, t-butoxystyrene, vinylbenzyldimethylamine, (4-vinylbenzyl) dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, vinylxylene, vinylnaphthalene, vinylpyridine, diphenylethylene, a tertiary amino group-containing diphenylethylene (e.g., 1-(4-N,N-dimethylaminophenyl)-1-phenylethylene). Among these, styrene and α-methylstyrene are particularly preferable.

When the polymer (A) is the copolymer of the conjugated diene compound and the aromatic vinyl compound, it is preferable that the polymer (A) be a copolymer having a structural unit derived from the 1,3-butadiene and a structural unit derived from styrene, in view of high living properties during anionic polymerization. It is preferable that the copolymer be a random copolymer formed of the conjugated diene compound and the aromatic vinyl compound. The random copolymer may contain a block moiety formed of the conjugated diene compound or an additional aromatic vinyl compound.

The amount of the aromatic vinyl compound used for the polymerization is preferably 3 to 55 mass %, more preferably 5 to 50 mass %, relative to the total amount of the monomer used for the polymerization, from the viewpoint of a good balance between low hysteresis loss property (fuel efficiency) and wet skid resistance and wear resistance of the resultant cross-linked product. The amount of the structural unit derived from the aromatic vinyl compound in the polymer is measured by means of $^1$H-NMR.

A compound other than the conjugated diene compound and the aromatic vinyl compound (hereinafter may be referred to as an "additional monomer") may also be used for polymerization as the monomer. Examples of the additional monomer include acrylonitrile, methyl (meth)acrylate, ethyl (meth)acrylate. The additional monomer is preferably used in a ratio of 5 mass % or less, more preferably 3 mass % or less, based on the total amount of the monomers used for polymerization.

In the polymerization, a solution polymerization method is particularly preferable. The monomer may be polymerized in a batch-wise manner or a continuous manner. When using the solution polymerization method, the monomer may be polymerized in an organic solvent in the presence of a polymerization initiator and an optional randomizer, for example.

At least one of an alkali metal compound and an alkaline-earth metal compound is preferably used as the polymerization initiator. Examples of the alkali metal compound and the alkaline-earth metal compound include alkyllithiums, such as methyllithium, ethyllithium, n-propyllithium, n-butyllithium, sec-butyllithium, and tert-butyllithium; 1,4-dilithiobutane, phenyllithium, stilbenelithium, naphthyllithium, 1,3-bis(1-lithio-1,3-dimethylpentyl)benzene, 1,3-phenylenebis(3-methyl-1-phenylpentylidene)dilithium, naphthylsodium, naphthylpotassium, di-n-butylmagnesium, di-n-hexylmagnesium, ethoxypotassium, calcium stearate, dilithium-based initiator (e.g., a reaction product of diisopropenylbenzene and butyllithium). Among these, the polymerization initiator is preferably lithium compounds. The polymerization initiator is preferably used in an amount of 0.2 to 20 mmol based on 100 g of the monomer used for polymerization.

The monomer may be polymerized in the presence of a mixture (R) of at least one of the alkali metal compound and the alkaline-earth metal compound and a compound having a functional group that interacts with silica. The polymerization-initiation terminal of the conjugated diene-based polymer can be modified by the functional group that interacts with silica by polymerizing the monomer in the presence of the mixture (R). As used herein, the term "functional group that interacts with silica" means a group having an element that interacts with silica, such as nitrogen, sulfur, phosphorus, oxygen, or silicon. The silicon possessed by the "functional group that interacts with silica" is silicon in the hydrocarbyloxysilyl group. The term "interaction" used herein means that a covalent bond is formed between molecules, or an intermolecular force (intermolecular electromagnetic force such as ion-dipole interaction, dipole-dipole interaction, a hydrogen bond, or Van der Waals force) that is weaker than a covalent bond is formed.

A compound modifying the polymerization-initiation terminal of the conjugated diene-based polymer (hereinafter may be referred to as an "initial modifier") is preferably a nitrogen-containing compound (e.g., a secondary amine compound), particularly preferably a cyclic or chain secondary amine compound. Specific examples of the nitrogen-containing compound include dimethylamine, piperidine, pyrrolidine, hexamethyleneimine, N-(trimethylsilyl)piperazine, N-(tert-butyldimethylsilyl)piperazine, N,N'-dimethyl-N'-trimethylsilyl-1,6-diaminohexane, 1,3-ditrimethylsilyl-1,3,5-triazinane. The initial modifier may be used either alone or in combination.

When polymerizing the monomer in the presence of the mixture (R), the mixture may be prepared in advance by mixing the at least one of the alkali metal compound and the alkaline-earth metal compound with the compound having a functional group that interacts with silica, and added to the polymerization system. Alternatively, the at least one of the alkali metal compound and the alkaline-earth metal compound, and the compound having a functional group that interacts with silica may be added to the polymerization system, and mixed in the polymerization system to prepare the mixture.

The randomizer (hereinafter may be referred to as a "vinyl group-content adjusting agent") may be used to adjust vinyl group content that represents the content of vinyl bonds in the polymer. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, tetramethylethylenediamine. The randomizer may be used either alone or in combination.

The organic solvent used for polymerization may be an organic solvent that is inert to the reaction. Examples of the organic solvent used for polymerization include aliphatic hydrocarbons, alicyclic hydrocarbons, and aromatic hydrocarbons. Among these, it is preferable to use a hydrocarbon having 3 to 8 carbon atoms. Specific examples of the hydrocarbon having 3 to 8 carbon atoms include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene. These organic solvents may be used either alone or in combination.

When using the solution polymerization method, the monomer concentration in the reaction solvent is preferably 5 to 50 mass %, more preferably 10 to 30 mass %, from the viewpoint of maintaining the balance between productivity and polymerization controllability. The polymerization reaction temperature is preferably −20 to 150° C., more preferably 0 to 120° C. It is preferable to effect the polymerization reaction under a pressure sufficient to substantially maintain the monomer to be in a liquid phase. Such a pressure may be achieved by pressurizing the reactor using gas that is inert to the polymerization reaction. The aforementioned polymerization reaction can produce a (modified) conjugated diene-based polymer having an active terminal (more specifically, an alkali metal active terminal or alkaline earth metal active terminal). As used herein, the term "(modified) conjugated diene-based polymer" is intended to include modified conjugated diene-based polymer and unmodified conjugated diene-based polymer.

1,2-vinyl group content of the (modified) conjugated diene-based polymer having the active terminal is preferably 20 to 70 mass %, more preferably 30 to 68 mass %, still more preferably 33 to 65 mass %. The 1,2-vinyl group content of less than 20 mass % may lead to poor grip property, whereas the 1,2-vinyl group content exceeding 70 mass % may lead to deterioration of low fuel consumption performance. As used herein, the term "1,2-vinyl group content" refers to the percentage of the structural unit having a 1,2-bond with respect to all the structural units derived from butadiene in the conjugated diene-based polymer. The 1,2-vinyl group content is measured by means of $^1$H-NMR.

<Terminal Modification Step>

The polymer (A) is preferably synthesized by reacting the alkali metal active terminal or alkaline earth metal active terminal of the (modified) conjugated diene-based polymer prepared through the aforementioned polymerization with a compound having a functional group capable of interacting with silica and being capable of reacting with the active terminal of the polymer (hereinafter the compound may be referred to as a "terminal modifier"). The reaction between a terminal modifier and the (modified) conjugated diene-based polymer having an active terminal produces the polymer (A) having, at its polymerization end terminal, a functional group capable of interacting with silica. When the modified conjugated diene-based polymer prepared through polymerization using a modification initiator is reacted with a terminal modifier, the resultant polymer has a functional group capable of interacting with silica at both terminals of the main chain of the polymer.

The usable terminal modifier is preferably a compound having a nitrogen atom to which active hydrogen is not bonded and being capable of reacting with the active terminal of the polymer. The nitrogen-containing terminal modifier may further have at least one element selected from the group consisting of silicon, sulfur, and phosphorus. The nitrogen, phosphorus, and sulfur contained in the terminal modifier may be protected with a protective group (e.g., a trisubstituted hydrocarbylsilyl group). The usable terminal modifier is preferably a compound having a protected primary amino group, particularly preferably a compound having a nitrogen-containing group and a hydrocarbyloxysilyl group, since such a compound achieves further increased fuel efficiency of the resultant crosslinked product. As used herein, the term "active hydrogen" refers to a hydrogen atom bonded to an atom other than a carbon atom, preferably a hydrogen atom having a binding energy lower than that of a carbon-hydrogen bond of polymethylene.

Specific examples of the terminal modifier include N,N-bis(trimethylsilyl)aminopropylmethyldimethoxysilane, N,N-bis(trimethylsilyl)aminopropyltrimethoxysilane, and modifications of these compounds in which at least one of alkyl and alkanediyl groups has a different carbon number; 2-(2,2-dimethoxy-1,2-azasilolidin-1-yl)-N,N-dimethyl-ethan-1-amine, 2,2-dimethoxy-1-(3-trimethoxysilylpropyl)-1,2-azasilolidine, 2,2-dimethoxy-1-phenyl-1,2-azasilolidine, 1 [3-(trimethoxysilyl)propyl]-4-trimethylsilylpiperazine, 1,4-bis[3-(trimethoxysilyl)propyl]piperazine, 1,3-bis[3-(triethoxysilyl)propyl]imidazolidine, 1,3-bis[3-(triethoxysilyl)propyl]hexahydropyrimidine, 1,3-bis[3-(trimethoxysilyl)propyl]-1,2,3,4-tetrahydropyrimidine, and modifications of these compounds in which at least one of alkyl and alkanediyl groups has a different carbon number; 4,4'-bis(N,N-dimethylamino)benzophenone; 4-(N,N-dimethylamino)benzaldehyde; t-butyl 4-(N,N-dimethylamino)benzoate; (2-isocyanato)ethyl; and N-methylpyrrolidone. These terminal modifiers may be used singly or in combination of two or more species.

The reaction between the polymerization active terminal and the terminal modifier may be, for example, a solution reaction. The solution reaction may be performed by use of a solution containing unreacted monomer after completion of the polymerization reaction. Alternatively, the solution reaction may be performed through isolation of the (modified) conjugated diene-based polymer contained in the solution, and dissolution of the isolated polymer in an appropriate solvent (e.g., cyclohexane). The aforementioned reaction may be performed by a batch or continuous process. No particular limitation is imposed on the method of adding the terminal modifier. For example, the terminal modifier may be added at one time or in a divided or continuous manner.

The amount of the terminal modifier used in the aforementioned reaction may be appropriately determined depending on the type of the compound used in the reaction. The amount of the terminal modifier is preferably 0.1 mole equivalents or more, more preferably 0.3 mole equivalents or more, relative to the metal atom (responsible for the polymerization reaction) of the polymerization initiator. An amount of 0.1 mole equivalents or more can lead to sufficient progress of the modification reaction, resulting in a suitable improvement in silica dispersibility. The upper limit of the terminal modifier used is preferably 1.5 mole equivalents or less, more preferably 1.2 mole equivalents or less, relative to the metal atom (responsible for the polymerization reaction) of the polymerization initiator.

The aforementioned reaction temperature is generally equal to the polymerization reaction temperature, and is preferably –20° C. to 150° C., more preferably 0 to 120° C. An excessively low reaction temperature tends to lead to an increase in the viscosity of the modified conjugated diene-based polymer, whereas an excessively high reaction temperature promotes the inactivation of the polymerization active terminal. The reaction time is preferably one minute to five hours, more preferably two minutes to one hour.

When the polymer (A) is produced, the polymerization active terminal may be reacted with a coupling agent for the purpose of, for example, increasing the Mooney viscosity or cold flow property of the polymer (A). The reaction using the coupling agent may be performed before the reaction between the polymerization active terminal and the terminal modifier, after the reaction between the polymerization active terminal and the terminal modifier, or simultaneously with the reaction between the polymerization active terminal and the terminal modifier.

Specific examples of the coupling agent include iso(thio)cyanate compounds, such as 2,4-tolylene diisocyanate, 2,6-tolylene diisocyanate, diphenylmethane diisocyanate, hexamethylene diisocyanate, and phenyl-1,4-diisothiocyanate; amido group or imido group-containing compounds, such as succinic amide, phthalic amide, N,N,N',N'-tetramethylphthalic amide, succinic imide, N-methylsuccinic imide, maleimide, and phthalimide; pyridyl-substituted ketone/vinyl compounds, such as dibenzoylpyridine, diacetylpyridine, and divinylpyridine; silicon compounds, such as dibutyldichlorosilane, methyltrichlorosilane, and tetrachlorosilane; ester compounds, such as diethyl phthalate and diethyl maleate; ketone compounds, such as N,N,N',N'-tetramethyl-4,4'-diaminobenzophenone and N,N,N',N'-tetraethyl(4,4'-diamino)-benzophenone; and tin compounds, such as tetrachlorotin and dibromodimethyltin. These coupling agents may be used singly or in combination of two or more species.

The reaction between the polymerization active terminal and the coupling agent may be, for example, a solution reaction. The amount of the coupling agent used is preferably 0.1 mole equivalents or more, more preferably 0.3 mole equivalents or more, relative to the metal atom (responsible for the polymerization reaction) of the polymerization initiator. The upper limit of the coupling agent used is preferably 1.5 mole equivalents or less, more preferably 1.2 mole equivalents or less, relative to the metal atom (responsible for the polymerization reaction) of the polymerization initiator. The conditions for the reaction (e.g., reaction process, reaction temperature, and reaction time) are similar to those described in the terminal modification step.

The polymer (A) can be produced by removing the solvent from the above-prepared solution, and isolating the resultant polymer. The polymer can be isolated through a known solvent removal method (e.g., steam stripping) or a drying operation such as thermal treatment. Particularly preferably, the polymer (A) has at least one nitrogen-containing functional group selected from the group consisting of a primary amino group, a protected primary amino group, and an onium-form primary amino group, in view of achieving a higher effect of improving fuel efficiency.

In the case where a compound having a protective group (e.g., a trimethylsilyl group) is used as the terminal modifier, a portion or the entirety of the protective group may be substituted by hydrogen in the resultant polymer (A). In the case where a protective-group-containing compound is used as the terminal modifier, the conjugated diene-based polymer modified with the terminal modifier may further be reacted with an onium salt generator. In this case, the resultant polymer (A) can be a modified conjugated diene-based polymer having an onium salt structure at the polymer terminal. The polymer (A) having an onium salt structure is preferred, since a crosslinked product produced from the polymer composition exhibits improved shape retainability.

Examples of the onium salt generator include metal halides, such as silicon halide compounds and tin halide compounds; sulfuric acid esters; phosphoric acid esters; carbonic acid esters; nitric acid esters; inorganic acids, such as hydrofluoric acid, hydrochloric acid, sulfuric acid, nitric acid, and phosphoric acid; inorganic acid salts, such as potassium fluoride, tetramethylammonium fluoride, and tetra-n-butylammonium fluoride; and organic acids, such as carboxylic acid and sulfonic acid. These onium salt generators may be used singly or in combination of two or more species.

The polymer (A) has a glass transition point (Tg) of preferably –100° C. or higher, more preferably –90° C. or higher, still more preferably –80° C. or higher, since the resultant crosslinked product can exhibit higher rigidity. In order to secure sufficient fuel efficiency of the resultant crosslinked product, the glass transition point of the polymer (A) is preferably 0° C. or lower, more preferably –10° C. or lower, still more preferably –20° C. or lower. The glass transition point of the polymer (A) is determined according to JIS K7121 by use of a melting curve prepared with a differential scanning calorimeter (DSC).

The polymer (A) has a weight average molecular weight (Mw) (in terms of polystyrene) as measured by means of gel permeation chromatography (GPC) of preferably $1.0 \times 10^5$ or more. When the Mw is less than $1.0 \times 10^5$, the resultant crosslinked product tends to exhibit poor shape stability, tensile strength, and wear resistance. The Mw of the polymer (A) is more preferably $1.2 \times 10^5$ or more, still more preferably $1.5 \times 10^5$ or more. The Mw of the polymer (A) is preferably $1.5 \times 10^6$ or less. When the Mw is more than $1.5 \times 10^6$, the resultant polymer composition tends to exhibit poor processability. The Mw of the polymer (A) is more preferably $1.3 \times 10^6$ or less, still more preferably $1.0 \times 10^6$ or less.

In order to produce a crosslinked product exhibiting excellent low hysteresis loss property, the amount of the polymer (A) contained in the polymer composition is preferably 20 mass % or more, more preferably 30 mass % or more, still more preferably 40 mass % or more, relative to the total amount of the polymer components contained in the polymer composition. The amount of the polymer (A) is preferably 95 mass % or less, more preferably 90 mass % or less, still more preferably 80 mass % or less, relative to the total amount of the polymer components contained in the polymer composition. The amount of the polymer (A) is preferably 30 mass % or more, more preferably 30 to 95 mass %, relative to the total amount of the rubber components contained in the polymer composition.

<<Functional-Group-Containing Polymer (B)>>

The functional-group-containing polymer (B) (hereinafter may be referred to simply as "polymer (B)") has at least one functional group selected from the group consisting of an epoxy group, an acid anhydride structure, an oxazoline group, a hydroxyl group, a carboxyl group, and a sulfo group (hereinafter the functional group may be referred to as "specific functional group").

Regarding the specific functional group, the epoxy group is intended to include an oxetanyl group and an oxiranyl group. Examples of the acid anhydride structure include structures derived from carboxylic anhydrides such as acetic anhydride, propionic anhydride, oxalic anhydride, succinic anhydride, phthalic anhydride, maleic anhydride, and benzoic anhydride. Among these acid anhydride structures, a structure derived from maleic anhydride or succinic anhydride is preferred. Examples of the hydroxyl group include an alcoholic hydroxyl group and a phenolic hydroxyl group. Preferred is an alcoholic hydroxyl group.

The specific functional group is preferably at least one species selected from the group consisting of an epoxy group, an acid anhydride structure, an oxazoline group, and an alcoholic hydroxyl group, more preferably at least one species selected from the group consisting of an epoxy group and an acid anhydride structure, particularly preferably an epoxy group, since such a preferred functional group exhibits high reactivity with the nitrogen-containing functional group of the polymer (A). The polymer (B) may have only one specific functional group, or may have two or more specific functional groups in combination.

No particular limitation is imposed on the main skeleton of the polymer (B), so long as the resultant polymer has a specific functional group. Specific examples of preferred polymer (B) include polymers having, as a main skeleton, polyolefin (e.g., polyethylene, polypropylene, polyisobutylene, or poly(1-butene)), styrene, polymaleimide, a styrene-maleimide copolymer, a styrene-maleic anhydride copolymer, an olefin-maleic anhydride copolymer, poly(meth)acrylate, an olefin-(meth)acrylic acid copolymer, or an olefin-(meth)acrylic acid-maleic anhydride copolymer. Of these, a poly(meth)acrylic polymer (specifically, poly(meth)acrylate or an olefin-(meth)acrylic acid copolymer) is preferred, since such a polymer facilitates introduction of a specific functional group and has an appropriately high melting point. The terms "(meth)acrylic" and "(meth)acrylate" as used herein are intended to include "acrylic and methacrylic" and "acrylate and methacrylate," respectively.

The amount of a specific functional group contained in the polymer (B) (hereinafter the amount may be referred to as "functional-group-modified amount") is preferably 0.15 mmol or more relative to 1 g of the polymer (B). The functional-group-modified amount preferably falls within the aforementioned range, since the effect of improving fuel efficiency and rigidity can be further increased. The functional-group-modified amount is more preferably 0.20 mmol or more, still more preferably 0.25 mmol or more, relative to 1 g of the polymer (B). In order to prevent impairment of the processability of the polymer composition, the functional-group-modified amount is preferably 2.0 mmol or less, more preferably 1.5 mmol or less, still more preferably 1.2 mmol or less, relative to 1 g of the polymer (B).

The functional-group-modified amount of the polymer (B) can be determined by a common chemical analysis technique. In the case of, for example, an epoxy-group-containing polymer, the functional-group-modified amount is determined by an epoxy equivalent measuring method according to JIS K7236. In the case of a polymer containing an acid anhydride structure, the functional-group-modified amount is determined by an acid value measuring method according to JIS 0070.

No particular limitation is imposed on the position at which a specific functional group is bonded in the polymer (B). Specifically, the polymer (B) may have a specific functional group at the main-chain terminal of the polymer, at a portion different from the main-chain terminal of the polymer, or at both a portion different from the main-chain terminal of the polymer and the main-chain terminal of the polymer. The phrase "portion different from the main-chain terminal of the polymer" refers to the case where a specific functional group is bonded at a side chain of the polymer, and the case where a specific functional group forms a portion of the main skeleton of the polymer. The polymer (B) preferably has a specific functional group at least at a side chain, since the resultant crosslinked product exhibits high rigidity, and the effect of improving fuel efficiency is sufficiently achieved.

The polymer (B) preferably has a melting point (Tm) and a glass transition point (Tg) higher than the glass transition point of the polymer (A), since the resultant crosslinked product exhibits higher rigidity. Specifically, at least one of the melting point (Tm) and glass transition point (Tg) of the polymer (B) is preferably 70° C. or higher, more preferably 80° C. or higher, still more preferably 90° C. or higher. In order to secure sufficient fuel efficiency of the resultant crosslinked product, the melting point or glass transition point of the polymer (B) is preferably 150° C. or lower, more preferably 140° C. or lower, still more preferably 135° C. or lower. The melting point and glass transition point of the polymer (B) are determined according to JIS K7121 by use of a melting curve prepared with a differential scanning calorimeter (DSC).

No particular limitation is imposed on the method for synthesizing the polymer (B), so long as the polymer has a specific functional group. The polymer (B) is synthesized by, for example, a method involving graft polymerization of a monomer having a specific functional group to a polymer having no specific functional group, or a method involving polymerization of a monomer having a specific functional group.

The polymer (B) may be a commercially available product. Specific examples of the commercially available product include Youmex (trade name) 100TS, 1010, 1001, 303, 5200, 5500, and CA620 (manufactured by Sanyo Chemical Industries, Ltd.); Epocros RPS-1005 (manufactured by Nippon Shokubai Co., Ltd.); SMA EF-30, EF-40, EF-60, EF-80, SMA 1000, 2000, and 3000 (manufactured by Cray Valley); Bondfast BF-2C, BF-E, CG5001, BF-2B, BF-7B, BF-7L, and BF-7M (manufactured by Sumitomo Chemical Company, Limited); and LOTADER GMA AX8840 and AX8900, and BONDINE MAH LX4110, HX8210, TX8030, HX8290, 5500, and AX8390 (manufactured by Arkema). These polymers (B) may be used singly or in combination of two or more species.

The polymer (B) has a weight average molecular weight (Mw) (in terms of polystyrene) as measured by means of GPC of preferably $1.0 \times 10^4$ or more, more preferably $5.0 \times 10^4$ or more, still more preferably $7.0 \times 10^4$ or more, in order to achieve a good balance between the rigidity of the resultant crosslinked product and the processability of the polymer composition. The Mw of the polymer (B) is preferably $2.0 \times 10^6$ or less. When the Mw is more than $2.0 \times 10^6$, rolling resistance tends to be lowered, and the polymer composition tends to exhibit poor processability. The Mw of the polymer (B) is more preferably $1.0 \times 10^6$ or less, still more preferably $5.0 \times 10^5$ or less.

The amount of the polymer (B) contained in the polymer composition is preferably 1 to 15 mass % relative to the entire amount of the composition. The amount of the polymer (B) is preferably 1 mass % or more, since the effect of improving the rigidity of the resultant crosslinked product can be sufficiently increased, and the crosslinked product exhibits lower rolling resistance. The amount of the polymer (B) is preferably 15 mass % or less, since a tire produced from the crosslinked rubber exhibits sufficient fuel efficiency and processability. The amount of the polymer (B) is more preferably 2 mass % or more, still more preferably 3 mass % or more, relative to the entire amount of the polymer composition. The amount of the polymer (B) is more preferably 12 mass % or less, still more preferably 10 mass % or less.

The polymer composition of the present disclosure contains the polymer (A) (i.e., rubber component) and the polymer (B) (i.e., resin component). The ratio by mass of the polymer (A) to the polymer (B) in the polymer composition (i.e., polymer (A)/polymer (B)) is preferably 99/1 to 70/30. When the amount of the polymer (A) is excessively large (i.e., the amount of the polymer (B) is excessively small), sufficient rigidity is not achieved, and a tire produced from the resultant crosslinked product tends to exhibit poor running stability. Meanwhile, when the amount of the polymer (A) is excessively small (i.e., the amount of the polymer (B) is excessively large), a tire produced from the resultant crosslinked product tends to exhibit poor rolling resistance and processability. The ratio by mass of the polymer (A) to the polymer (B) is more preferably 98/2 to 80/20, still more preferably 97.5/2.5 to 85/15, from the viewpoints of the compatibility between the rigidity and rolling resistance of the crosslinked product and good tire processability.

<<Additional Component>>

The polymer composition of the present disclosure may further contain a component (additional component) other than the aforementioned polymer (A) and polymer (B), so long as the advantageous effects of the present disclosure are not impaired. The additional component will next be described.

The polymer composition of the present disclosure preferably contains a reinforcing filler for increasing the strength of the crosslinked product. Examples of the reinforcing filler include silica, carbon black, an inorganic compound represented by formula (1):

$$nM^1 \cdot mSiO_k \cdot iH_2O \tag{1}$$

wherein $M^1$ is at least one species selected from the group consisting of a specific metal which is any of aluminum, magnesium, titanium, and calcium, an oxide of the specific metal, a hydroxide of the specific metal, a hydrate of the specific metal oxide, and a hydrate of the specific metal hydroxide; n is an integer of 1 to 5; m is an integer of 0 to 10; k is an integer of 2 to 5; and i is an integer of 0 to 10; (hereinafter the compound may be referred to as "inorganic compound (M)"), and reinforcing fiber (e.g., inorganic fiber such as glass fiber or carbon fiber, or organic fiber such as nylon or polyester). The reinforcing filler is preferably at least one species selected from the group consisting of silica, carbon black, and an inorganic compound (M).

Examples of the silica include wet silica (hydrated silica), dry silica (silicic anhydride), colloidal silica, precipitated silica, calcium silicate, and aluminum silicate. Of these, wet silica is particularly preferred from the viewpoints of an improvement in fracture resistance, and the compatibility between wet grip property and low rolling resistance. Use of high dispersible-type silica is preferred for achieving effective dispersion of the silica in the polymer composition and improvements in physical properties and processability. These silica materials may be used singly or in combination of two or more species. Examples of the carbon black include, but are not particularly limited to, GPF, FEF, HAF, ISAF, and SAF. The rubber composition may further contain, in addition to silica or carbon black, any reinforcing filler (e.g., clay or calcium carbonate) as an inorganic filler.

Specific examples of the inorganic compound (M) include compounds containing aluminum as the specific metal, such as aluminum oxide, alumina monohydrate, aluminum hydroxide, aluminum carbonate, aluminum silicate, and aluminum calcium oxide (e.g., $Al_2O_3 \cdot CaO \cdot 2SiO_4$); compounds containing magnesium as the specific metal, such as magnesium oxide, magnesium hydroxide, magnesium carbonate, magnesium silicate, magnesium calcium silicate ($CaMgSiO_4$), and talc; compounds containing titanium as the specific metal, such as titanium oxide; and compounds containing calcium as the specific metal, such as calcium oxide, calcium hydroxide, calcium carbonate, and calcium silicate.

The reinforcing filler may be selected from among silica, carbon black, and an inorganic compound (M). These may be used singly or in combination of two or more species. The polymer composition preferably contains silica as the reinforcing filler, since the combination of silica with the polymer (A) achieves a high effect of improving tire properties. In particular, wet silica, dry silica, or colloidal silica is preferably used. When a reinforcing filler is used, the amount of the reinforcing filler contained in the polymer composition (or the total amount of two or more reinforcing fillers contained in the polymer composition) is preferably 25 to 130 parts by mass, more preferably 30 to 110 parts by mass, relative to 100 parts by mass of the total amount of the polymer components contained in the polymer composition.

The polymer composition generally contains a crosslinking agent. Examples of the crosslinking agent include sulfur, sulfur halides, organic peroxides, quinone dioximes, organic polyamine compounds, and alkyl phenolic resins having a methylol group. Sulfur is generally used. The amount of sulfur is preferably 0.1 to 5 parts by mass, more preferably 0.5 to 3 parts by mass, relative to 100 parts by mass of the total amount of the rubber components contained in the polymer composition.

The polymer composition of the present disclosure, which contains the polymer (A), may contain an additional rubber component different from the polymer (A). No particular limitation is imposed on the type of the additional rubber component, but unmodified rubber is preferred. Examples of the additional rubber component include butadiene rubber (BR, such as high cis BR having a cis-1,4 bond content of 90% or more), styrene butadiene rubber (SBR), natural rubber (NR), isoprene rubber (IR), styrene-isoprene copolymer rubber, and butadiene-isoprene copolymer rubber. The amount of the additional rubber component is preferably 5 to 60 parts by mass, more preferably 10 to 50 parts by mass, relative to 100 parts by mass of the total amount of the polymer components (the polymer (A), the polymer (B), and the additional rubber component) contained in the polymer composition.

The polymer composition may contain, in addition to the aforementioned components, any additive that is commonly used in a polymer composition for, for example, tire. Examples of the additive include an antioxidant, zinc oxide, stearic acid, a softener, sulfur, a vulcanization accelerator, a silane coupling agent, a compatibilizer, a vulcanization aid, a process oil, a processing aid, and an anti-scorching agent. The amount of such an additive incorporated into the polymer composition may be appropriately determined in accordance with the various types of components, so long as the advantageous effects of the present disclosure are not impaired.

<<Production Methods for Polymer Composition and Crosslinked Product>>

The polymer composition of the present disclosure can be produced through mixing (specifically, kneading) of the polymer (A), the polymer (B), and an optional component by means of, for example, an open-type kneader (e.g., a roll) or a closed-type kneader (e.g., a Banbury mixer).

In the kneading process, firstly, the polymer (A) is melt-kneaded with the polymer (B) and an additive other than a vulcanization compounding agent (a crosslinking agent, a vulcanization accelerator, or a vulcanization aid) (hereinafter the additive may be referred to as "first additive") by means of a kneader (first step). The first additive preferably contains at least a reinforcing filler. The kneading temperature (the temperature of a kneaded product) can be appropriately determined in the first step. The kneading temperature is preferably equal to or higher than the melting point (Tm) and glass transition point (Tg) of the polymer (B). This melt kneading causes mixing of the first additive with the polymer components, resulting in sufficient achievement of, for example, the following effects: an increase in the strength of the vulcanized rubber product, an improvement in the kneadability of the polymer composition, and prevention of impairment of the rubber due to radicals generated during kneading.

The "polymer composition containing the polymer (A) and the polymer (B)" as used herein corresponds to a polymer composition prepared through completion of the reaction between the nitrogen-containing functional group of the polymer (A) and the specific functional group of the polymer (B) (more specifically, completion of the reaction between the entirety of the specific functional group of the polymer (B) and the nitrogen-containing functional group of the polymer (A), or the reaction between the entirety of the nitrogen-containing functional group of the polymer (A) and the specific functional group of the polymer (B)) after mixing of the polymer (A), the polymer (B), and the first additive.

Subsequently, the kneaded product prepared in the first step is optionally cooled to room temperature, and then a vulcanization compounding agent is added to the kneaded product, followed by melt-kneading by means of a kneader (second step). No particular limitation is imposed on the kneading temperature in the second step, and the kneading temperature may be equal to or lower than the melting point and glass transition point of the polymer (B). A crosslinked product can be produced through molding of the polymer composition prepared in the second step and subsequent crosslinking (vulcanization).

The step of kneading the polymer composition, which contains the polymer (A) and the polymer (B), probably causes reaction between the nitrogen-containing functional group of the polymer (A) and the specific functional group of the polymer (B), thereby reducing the molecular mobility of the polymer (A) and achieving impartment of rigidity, although the present disclosure is not limited thereto. In the case where the polymer composition contains a reinforcing filler together with the polymer (A) and the polymer (B), the step of kneading the polymer composition probably causes interaction between the specific functional group unreacted with the polymer (A) and the reinforcing filler, thereby increasing the dispersibility of the reinforcing filler, and thus achieving production of a crosslinked product exhibiting superior fuel efficiency.

<<Crosslinked Product and Tire>>

The crosslinked product obtained by use of the polymer composition of the present disclosure can be applied to various rubber products. For example, the crosslinked product includes tires (e.g., tire tread, undertread, carcass, sidewall, and bead); sealing materials, such as packing, gasket, weather strip, and O-ring; interior and exterior surface materials for various vehicles, such as automobile, ship, aircraft, and train; building materials; vibration-proof rubbers for industrial machines and facilities; hoses and hose covers, such as diaphragm, roll, radiator hose, and air hose; belts, such as belts for power transmission; linings; dust boots; materials for medical devices; fenders; insulating materials for electric wires; and other industrial products.

The polymer composition of the present disclosure can provide a crosslinked product exhibiting excellent low fuel consumption performance and excellent rigidity. Thus, the polymer composition of the present disclosure is particularly suitable for use as a material of a tire tread and sidewall.

The tire can be produced by a customary method. For example, the polymer composition including a polymer component and an optional component is mixed by means of a kneader to form a sheet, and the sheet is disposed at a predetermined position and vulcanized by a customary method, to thereby form a tread rubber or a sidewall rubber. A pneumatic tire is thereby produced.

EXAMPLES

The present disclosure will next be described in detail by way of examples, which should not be construed as limiting the disclosure thereto. Unless otherwise specified, the units "part(s)" and "%" described in Examples and Comparative Examples refer to "part(s) by mass" and "mass %," respectively. The physical properties of a polymer and rubber were determined as described below.

(1) Bonded styrene content (%): determined by means of $^1$H-NMR analysis at 500 MHz (solvent: deuterated chloroform).
(2) Vinyl bond content (%): determined by means of $^1$H-NMR analysis at 500 MHz.
(3) Glass transition point (° C.) of (modified) conjugated diene-based polymer: measured through differential scanning calorimetry (DSC) according to ASTM D3418.
(4) Weight average molecular weight of (modified) conjugated diene-based polymer: the weight average molecular weight (Mw) (in terms of polystyrene) of the polymer was determined from the retention time corresponding to the vertex of the maximum peak of a GPC curve obtained by means of a gel permeation chromatograph (GPC) "HLC-8120GPC" (manufactured by Tosoh Corporation) under the following conditions.

(Gpc Conditions)

Column: trade name "GMHXL" (manufactured by Tosoh Corporation) (2 columns)
Column temperature: 40° C.
Mobile phase: tetrahydrofuran
Flow rate: 1.0 mL/min
Sample concentration: 10 mg/20 mL (5) Mooney viscosity (MV): measured according to JIS K6300-1 by use of an L-rotor under the following conditions: preheating: 1 minute, rotor operation time: 4 minutes, and temperature: 100° C.

(6) Weight average molecular weight of functional-group-containing polymer: the weight average molecular weight (in terms of polystyrene) of the polymer was determined by means of a gel permeation chromatograph (GPC) (PL-GPC220, manufactured by Agilent Technologies, Inc.) under the following conditions.

Column: PLgel Olexis
Developing solvent: o-dichlorobenzene
Measurement temperature: 135° C.

(7) Melting point and glass transition point (° C.) of functional-group-containing polymer: determined by means of a differential scanning calorimeter (DSC, manufactured by TA Instruments) by the method according to JIS K7121.

Synthesis Example 1: Synthesis of Polymer (a-1)

Cyclohexane (2,500 g), tetrahydrofuran (50 g), styrene (125 g), and 1,3-butadiene (365 g) were added to an autoclave reactor (inner volume: 5 L) purged with nitrogen. The temperature of the mixture contained in the reactor was adjusted to 10° C., and then n-butyllithium (5.20 mmol) was added to the reactor for initiation of polymerization. The polymerization was performed under adiabatic conditions, and the maximum temperature reached 85° C. When the polymerization conversion reached 99% (after the elapse of 26 minutes from initiation of the polymerization), 1,3-butadiene (10 g) was added to the reactor over two minutes. Subsequently, the polymerization was further performed for three minutes, and then 3-(4-trimethylsilyl-1-piperazino) propyltriethoxysilane (4.46 mmol) was added to the reactor. Then, reaction was allowed to proceed for 15 minutes, to thereby prepare a modified conjugated diene-based polymer solution.

Pentaerythritol tetrakis[3-(3,5-di-tert-butyl-4-hydroxyphenyl)propionate] was added to the modified conjugated diene-based polymer solution. The solvent was then removed through steam stripping, and the resultant product was dried by means of a heating roll whose temperature was adjusted to 110° C., to thereby produce a polymer (a-1). The properties of the polymer (a-1) are shown in Table 1 below.

Synthesis Example 2: Synthesis of Polymer (a-2)

A polymer (a-2) was produced in the same manner as in Synthesis Example 1, except that 3-(4-trimethylsilyl-1-piperazino)propyltriethoxysilane was replaced with N,N-bis(trimethylsilyl)aminopropylmethyldiethoxysilane. The properties of the polymer (a-2) are shown in Table 1 below.

Synthesis Example 3: Synthesis of Polymer (a-3)

A polymer (a-3) was produced in the same manner as in Synthesis Example 1, except that N-(tert-butyldimethylsilyl) piperazine (4.20 mmol) was added to the autoclave reactor together with cyclohexane, tetrahydrofuran, styrene, and 1,3-butadiene, and 3-(4-trimethylsilyl-1-piperazino)propyltriethoxysilane was replaced with N,N-bis(trimethylsilyl) aminopropylmethyldiethoxysilane. The properties of the polymer (a-3) are shown in Table 1 below.

Synthesis Example 4: Synthesis of Polymer (a-4)

A polymer (a-4) (i.e., unmodified conjugated diene-based polymer) was produced in the same manner as in Synthesis Example 1, except that 3-(4-trimethylsilyl-1-piperazino)propyltriethoxysilane was not used. The properties of the polymer (a-4) are shown in Table 1.

TABLE 1

| Polymerization formula | | | Synthesis Example 1 | Synthesis Example 2 | Synthesis Example 3 | Synthesis Example 4 |
|---|---|---|---|---|---|---|
| Type of (modified) conjugated diene-based polymer | | | a-1 | a-2 | a-3 | a-4 |
| Solvent | Cyclohexane | (g) | 2500 | 2500 | 2500 | 2500 |
| Vinyl group-content adjusting agent | Tetrahydrofuran | (g) | 50 | 50 | 50 | 50 |
| Monomer | Styrene | (g) | 125 | 125 | 125 | 125 |
| | 1,3-Butadiene | (g) | 365 | 365 | 365 | 365 |
| | Additional butadiene | (g) | 10 | 10 | 10 | 10 |
| Polymerization initiator | n-Butyllitium | (mmol) | 5.20 | 5.20 | 5.20 | 5.20 |
| | INI-N-1 *1 | (mmol) | — | — | — | — |
| | INI-N-2 *2 | (mmol) | — | — | 4.20 | — |
| Terminal modifier | N—Si-1 *3 | (mmol) | — | 4.46 | 4.46 | — |
| | N—Si-2 *4 | (mmol) | 4.46 | — | — | — |
| Properties of polymer | Bonded styrene content | (%) | 25 | 25 | 25 | 25 |
| | Vinyl group content | (%) | 57 | 58 | 57 | 58 |
| | Weight average molecular weight before modification (×10$^4$) | | 20 | 20 | 20 | 20 |
| | Mooney viscosity (ML$_{1+4}$, 100° C.) | | 9 | 8 | 12 | 10 |
| | Glass transition point (° C.) | | −25 | −25 | −25 | −25 |

Abbreviations shown in Table 1 have the following meanings.

INI-N-1 (*1): N-trimethylsilylpiperazine
INI-N-2 (*2): N-(tert-butyldimethylsilyl)piperazine
N-Si-1 (*3): N,N-bis(trimethylsilyl)aminopropylmethyldiethoxysilane
N-Si-2 (*4): 3-(4-trimethylsilyl-1-piperazino)propyltriethoxysilane Examples 1 to 3 and Comparative Examples 1 to 5

Components were mixed according to the formulation shown in Table 2 below, and the resultant mixture was melt-kneaded to thereby produce a polymer composition. The kneading was performed as described below.

In a first kneading step, a (modified) conjugated diene-based polymer, polybutadiene rubber, a functional-group-containing polymer (only Examples 1 to 3), an extender oil, silica, a silane coupling agent, stearic acid, an antioxidant, and zinc oxide were mixed and kneaded by means of a batch-type mixer equipped with a temperature controller (trade name: Laboplastomill, manufactured by Toyo Seiki Seisaku-sho, Ltd.) under the following conditions: setting temperature: 100° C., rotation speed: 60 rpm, and kneading time: 4 minutes. The temperature of a kneaded product discharged from the mixer was about 150° C. during discharge.

Subsequently, in a second kneading step, the kneaded product prepared in the first kneading step was cooled to room temperature, and then a vulcanization accelerator and sulfur were added to the aforementioned mixer. The resultant mixture was kneaded under the following conditions: setting temperature: 70° C., rotation speed: 60 rpm, and kneading time: 1.5 minutes, to thereby prepare a polymer composition. The temperature of a kneaded product discharged from the mixer was 100° C. or lower during discharge. Thereafter, the resultant polymer composition was molded and vulcanized by means of a vulcanizing press at 160° C. for a predetermined period of time, to thereby produce crosslinked rubber. The resultant crosslinked rubber was evaluated for the following physical properties (1) to (3). The results are shown in Table 2 below.

(1) Storage Modulus (50° C. G': Steering Stability)

The storage modulus G' of the crosslinked rubber was measured by means of a shear-type dynamic spectrometer (manufactured by TA Instruments) under the following conditions: angular velocity: 100 radians/second, temperature: 50° C., and shear strain: 1%. The storage modulus G' was represented by an index relative to that (taken as 100) of the crosslinked rubber of Comparative Example 1. A larger value indicates better steering stability.

(2) Payne Effect (50° C. $\Delta$G': Filler Dispersibility)

The storage modulus G' of the crosslinked rubber was measured by means of a shear-type dynamic spectrometer (manufactured by TA Instruments) under the following conditions: angular velocity: 100 radians/second, temperature: 50° C., and shear strain: 0.14% to 10%. The strain dependence of the storage modulus G' was determined, and a difference between the determined maximum value and the determined minimum value was calculated. The difference was represented by an index relative to that (taken as 100) of the crosslinked rubber of Comparative Example 1. A larger value indicates better filler dispersibility.

(3) Loss Tangent (50° C. Tan δ: Rolling Resistance)

The ratio of loss modulus G" to storage modulus G' (50° C. tan δ) of the crosslinked rubber was measured by means of a shear-type dynamic spectrometer (manufactured by TA Instruments) under the following conditions: angular velocity: 100 radians/second, temperature: 50° C., and shear strain: 1%. The 50° C. tan δ was represented by an index relative to that (taken as 100) of the crosslinked rubber of Comparative Example 1. A larger value indicates low rolling resistance (i.e., better result).

TABLE 2

| | | | Example 1 | Example 2 | Example 3 | Comparative Example 1 | Comparative Example 2 |
|---|---|---|---|---|---|---|---|
| First kneading step | (Modified) conjugated diene-based polymer | Type | a-1 | a-2 | a-3 | a-1 | a-2 |
| | | Parts by mass | 70 | 70 | 70 | 70 | 70 |
| | Polybutadiene rubber *1 | Parts by mass | 30 | 30 | 30 | 30 | 30 |
| | Functional-group-containing polymer | Type | b-1 | b-1 | b-1 | — | — |
| | | Functional-group-modified amount (mmol/g) | 0.93 | 0.93 | 0.93 | — | — |
| | | Weight average molecular weight | 30000 | 30000 | 30000 | — | — |
| | | Melting point (° C.) | 135 | 135 | 135 | — | — |
| | | Parts by mass | 10 | 10 | 10 | 0 | 0 |
| | Extender oil *2 | Parts by mass | 30 | 30 | 30 | 30 | 30 |
| | Silica *3 | Parts by mass | 70 | 70 | 70 | 70 | 70 |
| | Silane coupling agent *4 | Parts by mass | 5.6 | 5.6 | 5.6 | 5.6 | 5.6 |
| | Stearic acid | Parts by mass | 2 | 2 | 2 | 2 | 2 |
| | Antioxidant *5 | Parts by mass | 1 | 1 | 1 | 1 | 1 |
| | Zinc oxide | Parts by mass | 3 | 3 | 3 | 3 | 3 |
| Second kneading step | Vulcanization accelerator 1 *6 | Parts by mass | 1.5 | 1.5 | 1.5 | 1.5 | 1.5 |
| | Vulcanization accelerator 2 *7 | Parts by mass | 1.8 | 1.8 | 1.8 | 1.8 | 1.8 |
| | Sulfur | Parts by mass | 1.5 | 1.5 | 1.5 | 1.5 | 1.5 |
| Properties of mixture | G'(50° C.) | Index | 110 | 105 | 120 | 100 | 95 |
| | $\Delta$ G'(50° C.) | Index | 110 | 160 | 170 | 100 | 140 |
| | tanδ(50° C.) | Index | 105 | 145 | 150 | 100 | 130 |

| | | | Comparative Example 3 | Comparative Example 4 | Comparative Example 5 |
|---|---|---|---|---|---|
| First kneading | (Modified) conjugated diene-based polymer | Type | a-3 | a-4 | a-4 |
| | | Parts by mass | 70 | 70 | 70 |

TABLE 2-continued

| step | Polybutadiene rubber *1 | Parts by mass | 30 | 30 | 30 |
|---|---|---|---|---|---|
| | Functional-group-containing polymer | Type | — | — | b-1 |
| | | Functional-group-modified amount (mmol/g) | — | — | 0.93 |
| | | Weight average molecular weight | — | — | 30000 |
| | | Melting point (° C.) | — | — | 135 |
| | | Parts by mass | 0 | 0 | 0 |
| | Extender oil *2 | Parts by mass | 30 | 30 | 30 |
| | Silica *3 | Parts by mass | 70 | 70 | 70 |
| | Silane coupling agent *4 | Parts by mass | 5.6 | 5.6 | 5.6 |
| | Stearic acid | Parts by mass | 2 | 2 | 2 |
| | Antioxidant *5 | Parts by mass | 1 | 1 | 1 |
| | Zinc oxide | Parts by mass | 3 | 3 | 3 |
| Second kneading step | Vulcanization accelerator 1 *6 | Parts by mass | 1.5 | 1.5 | 1.5 |
| | Vulcanization accelerator 2 *7 | Parts by mass | 1.8 | 1.8 | 1.8 |
| | Sulfur | Parts by mass | 1.5 | 1.5 | 1.5 |
| Properties of mixture | G'(50° C.) | Index | 90 | 110 | 115 |
| | ΔG'(50° C.) | Index | 140 | 80 | 85 |
| | tanδ(50° C.) | Index | 130 | 60 | 63 |

Trade names of components shown in Table 2 are as follows.
- b-1: trade name "Youmex 1001," maleic anhydride-modified polypropylene, manufactured by Sanyo Chemical Industries, Ltd.
- 1: trade name "BR01," manufactured by JSR Corporation
- 2: trade name "JOMO Process NC-140," manufactured by Japan Energy Corporation
- 3: trade name "ZEOSIL 1165MP," manufactured by Rhodia
- 4: trade name "Si75," manufactured by Evonik
- 5: trade name "Ozonone 6C," N-(1,3-dimethylbutyl)-N'-phenyl-p-phenylenediamine, manufactured by Seiko Chemical Co., Ltd.
- 6: trade name "Nocceler D," 1,3-diphenylguanidine, manufactured by Ouchi Shinko Chemical Industrial Co., Ltd.
- 7: trade name "Nocceler CZ," N-cyclohexyl-2-benzothiazolylsulfenamide, manufactured by Ouchi Shinko Chemical Industrial Co., Ltd.

As shown in Table 2, the crosslinked rubber produced from the polymer composition containing the polymer (A) and the polymer (B) (Examples 1 to 3) exhibited well-balanced storage modulus (at 50° C.), Payne effect, and tan δ (50° C.), as compared with the crosslinked rubber produced from the polymer composition not containing either of the polymer (A) and the polymer (B) (Comparative Examples 1 to 5). In view of a nitrogen-containing functional group of the polymer (A), a primary amino group achieved improvements in Payne effect and tan δ superior to those achieved by a secondary amino group. The polymer (A) containing a nitrogen-containing functional group at both terminals of the polymer achieved improvements in Payne effect and tan δ superior to those achieved by the polymer (A) containing a nitrogen-containing functional group at only one terminal of the polymer.

Examples 4 to 6 and Comparative Example 6

A polymer composition was produced through first and second kneading steps in the same manner as in Examples 1 to 3 and Comparative Examples 1 to 5, except that components were mixed according to the formulation shown in Table 3 below. Crosslinked rubber was produced from the polymer composition in the same manner as in Examples 1 to 3 and Comparative Examples 1 to 5, and the crosslinked rubber was evaluated for its physical properties. The results are shown in Table 3 below.

Example 7

The polymer (a-1) (70 parts by mass) was mixed with the polymer (b-1) (10 parts by mass), and the mixture was kneaded by means of the aforementioned batch-type mixer (temperature: 140° C., rotation speed: 60 rpm) for three minutes. The temperature of a kneaded product (thermoplastic elastomer) discharged from the mixer was about 140° C. during discharge. Components (including the resultant kneaded product) were mixed according to the formulation shown in Table 3 below, and a rubber composition was produced through first and second kneading steps in the same manner as in Examples 1 to 3 and Comparative Examples 1 to 5. Crosslinked rubber was produced from the rubber composition in the same manner as in Examples 1 to 3 and Comparative Examples 1 to 5, and the crosslinked rubber was evaluated for its physical properties. The results are shown in Table 3 below.

TABLE 3

| | | | Example 4 | Example 5 | Example 6 | Example 7 | Comparative Example 6 |
|---|---|---|---|---|---|---|---|
| First kneading step | Modified conjugated diene-based polymer | Type | a-1 | a-1 | a-1 | a-1 | a-1 |
| | | Parts by mass | 70 | 70 | 70 | 70 | 70 |
| | Polybutadiene rubber *1 | Parts by mass | 30 | 30 | 30 | 30 | 30 |
| | Functional-group-containing polymer | Type | b-2 | b-3 | b-4 | b-1 | — |
| | | Functional-group-modified amount (mmol/g) | 0.30 | 0.42 | 0.27 | 0.93 | — |
| | | Weight average molecular weight | 52000 | 256000 | 160000 | 30000 | — |

TABLE 3-continued

|  |  |  | Example 4 | Example 5 | Example 6 | Example 7 | Comparative Example 6 |
|---|---|---|---|---|---|---|---|
|  |  | Melting point (° C.) | 123 | 105 | — | 135 | — |
|  |  | Glass transition point (° C.) | — | — | 109 | 10 | — |
|  |  | Parts by mass | 10 | 10 | 10 | 10 | — |
|  | HDPE *8 | Parts by mass | — | — | — | 5.6 | 10 |
|  | Extender oil *2 | Parts by mass | 30 | 30 | 30 | 2 | 30 |
|  | Silica *3 | Parts by mass | 70 | 70 | 70 | 1 | 70 |
|  | Silane coupling agent *4 | Parts by mass | 5.6 | 5.6 | 5.6 | 3 | 5.6 |
|  | Stearic acid | Parts by mass | 2 | 2 | 2 | 1.5 | 2 |
|  | Antioxidant *5 | Parts by mass | 1 | 1 | 1 | 1.8 | 1 |
|  | Zinc oxide | Parts by mass | 3 | 3 | 3 | 1.5 | 3 |
| Second | Vulcanization accelerator 1 *6 | Parts by mass | 1.5 | 1.5 | 1.5 | 1.5 | 1.5 |
| kneading | Vulcanization accelerator 2 *7 | Parts by mass | 1.8 | 1.8 | 1.8 | 1.8 | 1.8 |
| step | Sulfur | Parts by mass | 1.5 | 1.5 | 1.5 | 1.5 | 1.5 |
| Properties | G'(50° C.) | Index | 130 | 105 | 105 | 113 | 110 |
| of mixture | ΔG'(50° C.) | Index | 105 | 115 | 110 | 115 | 60 |
|  | tanδ(50° C.) | Index | 103 | 110 | 105 | 108 | 70 |

Trade names of components shown in Table 3 are as follows. The trade names of *1 to *7 and b-1 are the same as those shown in Table 2.

- b-2: trade name "Youmex 5500," maleic anhydride-modified polypropylene, manufactured by Sanyo Chemical Industries, Ltd.
- b-3: trade name "BF-2C," ethylene-glycidyl methacrylate copolymer, manufactured by Sumitomo Chemical Company, Limited
- b-4: trade name "Epocros RPS-1005," oxazoline-modified polystyrene, manufactured by Nippon Shokubai Co., Ltd.
- 8: trade name "Novatec HD HF560," high-density polyethylene, manufactured by Japan polyethylene Corporation As shown in Table 3, the crosslinked rubber produced from each of the polymer compositions of Examples 4 to 6 exhibited well-balanced storage modulus (at 50° C.), Payne effect, and tan δ (50° C.), as compared with the crosslinked rubber produced from the polymer composition of Comparative Example 6. The crosslinked rubber produced from the polymer composition of Example 7, which was prepared by mixing of the pre-kneaded polymers (A) and (B) with other components, also exhibited good physical properties.

As is clear from the aforementioned results, the polymer composition containing the modified conjugated diene-based polymer (A) (which has a nitrogen-containing functional group) and the polymer (B) (which exhibits binding reactivity to the modified conjugated diene-based polymer (A)) can achieve improvements in filler dispersibility and rolling resistance while maintaining steering stability at a certain level.

The invention claimed is:

1. A polymer composition, comprising:
   a modified conjugated diene-based polymer having at least one nitrogen-containing functional group selected from the group consisting of a primary amino group, a secondary amino group, a tertiary amino group, a primary amino group having been protected or converted into an onium group, a secondary amino group having been protected or converted into an onium group, and a tertiary amino group having been converted into an onium group;
   a functional-group-containing polymer having at least one functional group selected from the group consisting of an epoxy group, an oxazoline group, a hydroxyl group, and a sulfo group; and
   at least one reinforcing filler selected from the group consisting of silica, carbon black, and an inorganic compound of formula (1), $nM^1 \cdot mSiO_k \cdot iH_2O$, where $M^1$ is at least one species selected from the group consisting of aluminum, magnesium, titanium, calcium, an oxide thereof, a hydroxide thereof, a hydrate of the oxide, and a hydrate of the hydroxide, n is an integer in a range of from 1 to 5, m is an integer in a range of from 0 to 10, k is an integer in a range of from 2 to 5, and i is an integer in a range of from 0 to 10,
   wherein the modified conjugated diene-based polymer is a random copolymer of a conjugated diene compound and a vinyl aromatic compound, the modified conjugated diene-based polymer has a weight average molecular weight in a range of from $1.0 \times 10^5$ to $1.5 \times 10^6$ and a glass transition point in a range of from −100° C. to 0° C., the functional-group-containing polymer has a weight average molecular weight of $1.0 \times 10^4$ or more, and a melting point and/or glass transition point of the functional-group-containing polymer in a range of from 70° C. to 150° C., and an amount of the functional-group-containing polymer is 2 to 12 mass % relative to the entire amount of the composition.

2. The composition of claim 1, wherein the ratio by mass of the modified conjugated diene-based polymer to the functional-group-containing polymer (the modified conjugated diene-based polymer/the functional-group-containing polymer) is 99/1 to 70/30.

3. The composition of claim 1, wherein an amount of the reinforcing filler is 25 to 130 parts by mass relative to 100 parts by mass of the total amount of the polymer components in the composition.

4. A method for producing a polymer composition, comprising:
   mixing a modified conjugated diene-based polymer (A) and functional-group-containing polymer (B) with a reinforcing filler (C),
   wherein the reinforcing filler selected from the group consisting of silica, carbon black, and an inorganic compound of formula (1), $nM^1 \cdot mSiO_k \cdot iH_2O$, where $M^1$ is at least one species selected from the group consisting of aluminum, magnesium, titanium, calcium, an oxide thereof, a hydroxide thereof, a hydrate of the metal oxide, and a hydrate of the hydroxide, n is an integer in a range of from 1 to 5, m is an integer in a range of from 0 to 10, k is an integer in a range of from 2 to 5, and i is an integer in a range of from 0 to 10, the modified conjugated diene-based polymer (A) has at least one nitrogen-containing functional group selected from the group consisting of a primary amino group, a secondary amino group, a tertiary amino group, a primary amino group having been protected or converted into an onium group, a secondary amino group having been protected or converted into an onium group, and a tertiary amino group having been converted into an onium group, the functional-group-containing polymer (B) has at least one functional group selected from the group consisting of an epoxy group, an oxazoline group, a hydroxyl group, and a sulfo group, the modified conjugated diene-based polymer is a random copolymer of a conjugated diene compound and a vinyl aromatic compound, the modified conjugated diene-based polymer has a weight average molecular weight in a range of from $1.0 \times 10^5$ to $1.5 \times 10^6$ and a glass transition point in a range of from $-100°$ C. to $0°$ C., the functional-group-containing polymer has a weight average molecular weight of $1.0 \times 10^4$ or more, and a melting point and/or glass transition point of the functional-group-containing polymer in a range of from $70°$ C. to $150°$ C., and an amount of the functional-group-containing polymer (B) is 2 to 12 mass % relative to the entire amount of the composition.

5. A method for producing a crosslinked product, the method comprising:
   adding a crosslinking agent to a polymer composition produced through the method of claim 4; and
   performing a crosslinking treatment after addition of the crosslinking agent.

6. The method of claim 4, wherein an amount of the reinforcing filler (C) is 25 to 130 parts by mass relative to 100 parts by mass of the total amount of the polymer components in the composition.

7. A crosslinked product, produced by crosslinking the composition of claim 1.

8. A tire, formed from the composition of claim 1.

* * * * *